(12) United States Patent
Lipp (10) Patent No.: US 12,434,639 B2
(45) Date of Patent: Oct. 7, 2025

(54) GROMMET AND METHOD OF INSTALLATION ON A VEHICLE

(71) Applicant: Ford Global Technologies, LLC, Dearborn, MI (US)

(72) Inventor: Douglas Christian Lipp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 18/371,204

(22) Filed: Sep. 21, 2023

(65) Prior Publication Data
US 2025/0100476 A1 Mar. 27, 2025

(51) Int. Cl.
*B60R 16/02* (2006.01)
*H01B 17/58* (2006.01)

(52) U.S. Cl.
CPC ....... *B60R 16/0222* (2013.01); *H01B 17/583* (2013.01)

(58) Field of Classification Search
CPC ..... F16L 15/00; H01B 17/583; H02G 15/013; H02G 3/22; G60R 16/0222
See application file for complete search history.

(56) References Cited

U.S. PATENT DOCUMENTS

| | | | |
|---|---|---|---|
| 4,520,976 A | | 6/1985 | Cournoyer et al. |
| 5,545,854 A | * | 8/1996 | Ishida .................. H02G 3/081 16/2.2 |
| 6,825,416 B2 | | 11/2004 | Okuhara |
| 8,872,044 B2 | * | 10/2014 | Nice .................. H02G 3/22 439/501 |
| 9,515,470 B2 | | 12/2016 | Herring et al. |
| 10,066,655 B2 | | 9/2018 | Garbe |
| 10,689,901 B2 | | 6/2020 | O'Leary et al. |
| 11,622,458 B1 | | 4/2023 | Hennrich et al. |
| 2014/0054064 A1 | * | 2/2014 | Gronowicz, Jr. ... B60R 16/0222 174/152 G |
| 2014/0332265 A1 | * | 11/2014 | Nagayasu .............. H02G 11/00 174/72 A |
| 2023/0402828 A1 | * | 12/2023 | Laflamme ................ H02G 3/22 |
| 2024/0125368 A1 | * | 4/2024 | Lechner ............. H01R 13/2421 |

FOREIGN PATENT DOCUMENTS

JP 2023007168 A * 1/2023

* cited by examiner

Primary Examiner — Timothy J Thompson
Assistant Examiner — Amol H Patel
(74) Attorney, Agent, or Firm — Vichit Chea; Price Heneveld LLP (57) ABSTRACT

A grommet for a wiring hole comprising an extendable body that is configured in a first sized ring and extendable into a second sized ring larger than the first sized ring, a lip extending around the extendable body and configured to engage a wiring hole for passing one or more wires, and one or more snap locks for locking the extendable body in the extended configuration disposed within the wiring hole on a vehicle.

20 Claims, 8 Drawing Sheets

GROMMET AND METHOD OF INSTALLATION ON A VEHICLE

FIELD OF THE DISCLOSURE

The present disclosure generally relates to grommets for lining a hole for routing wire or cable, and more particularly relates to a grommet that is easily installable in a wiring hole, particularly on a vehicle.

BACKGROUND OF THE DISCLOSURE

Motor vehicles are commonly equipped with wires or cables that are routed throughout the vehicle and extend through holes. To protect the wire, a grooved rubber grommet or plastic snap-in grommet is typically inserted in the hole to prevent wear and tear on the wires. It would be desirable to provide for a grommet that is easily installable into a wiring hole for protecting the wires, particularly on a vehicle.

SUMMARY OF THE DISCLOSURE

According to a first aspect of the present disclosure, a grommet ring for a wiring hole includes an extendable body that is configured in a first size ring and extendable into a second size ring larger than the first size ring and a lip extending around the extendable body and configured to engage a wiring hole for routing one or more wires and one or more snap locks for locking the body in the second size ring disposed within the wiring hole.

Embodiments of the first aspect of the present disclosure can include any one or a combination of the following features:
- the extendable body includes an injection-molded part.
- the extendable body includes a polymeric material;
- the one or more snap locks includes a plurality of snap locks;
- the plurality of snap locks includes a first snap lock and a second snap lock;
- the first and second snap locks each include a tooth that engages an edge in a locked position;
- the lip includes an inner lip and an outer lip configured to engage an inside and an outside surface proximate the wiring hole;
- the grommet ring further including one or more anti-rattle tabs;
- the extendable body has a dimension less than a dimension of the wiring hole;
- the extendable body includes a first portion, a second portion, and a hinge coupling the first portion to the second portion; and/or
- the hinge flexes to allow the body to move between the first and second sized rings.

According to a second aspect of the present disclosure, a vehicle includes a wire, a wiring hole, and grommet ring that includes an extendable body that is configured in a first size ring and extendable into a second size ring larger than the first size ring, a lip extending around the extendable body and configured to engage a wiring hole for routing wires and one or more snap locks for locking the extendable body in the extended second size ring disposed within the wiring hole and a central opening, where the wire extends through the central opening.

Embodiments of the second aspect of the present disclosure can also include the following features:
- the wiring hole is in a metal sheet and the grommet ring is polymeric;
- the extendable body comprises a first portion, a second portion, and a hinge coupling the first portion to the second portion, and further wherein the hinge flexes to allow the extendable body to move between the first and second sized rings; and
- a plurality of snap locks comprises a first snap lock and a second snap lock.

According to yet another aspect of the present disclosure, a method includes the steps of providing a grommet having an extendable body that is configured in a first size ring and extendable into a second size ring larger than the first size ring. A lip extends around the extendable body and is configured to engage a wiring hole for routing one or more wires. One or more snap locks are provided for locking the body in the second size ring disposed within the wiring hole. The grommet ring is inserted in a wiring hole in the vehicle and the size of the grommet ring is extended with one or more snap locks.

Embodiments of the third aspect of the present disclosure can also include the following features:
- pressing one or more buttons to extend the extendable body from the first size ring to the extended second size ring;
- routing a wire or cable through a central opening in the grommet;
- molding the grommet as a unitary piece; and
- the grommet is formed of a polymetric material.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
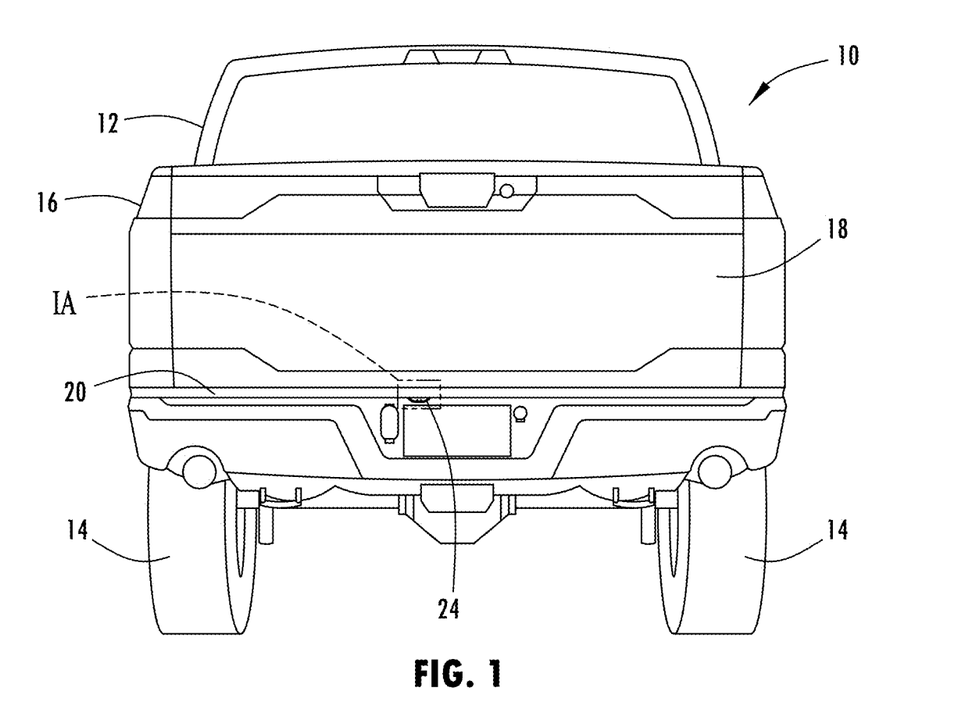
FIG. 1 is a rear view of a motor vehicle in the form of a pickup truck having a grommet located in a lower wall below the bed of the truck.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a grommet for a wiring hole and method of installing the grommet on a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or endpoint referred to. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with a grommet 24 assembled in a wiring hole, according to one example. The motor vehicle 10 is shown as a pickup truck, in the example illustrated. However, it should be appreciated that the motor vehicle 10 may include other motor vehicles, such as SUVs, sedans, buses, and other wheeled vehicles. Further, it should be appreciated that the motor vehicle 10 may include other types of vehicles, such as boats, airplanes, helicopters, and other transport vehicles.

The motor vehicle 10 includes a plurality of wheel and tire assemblies 14 and a vehicle body 12 which generally defines an interior cabin of the vehicle and includes a pickup bed 16 generally rearward of the interior cabin towards the rear end of the motor vehicle 10. The pickup bed 16 includes a tailgate 18 at the rear end of thereof. The tailgate 18 provides a pivoting door closure to the pickup bed 16 such that when oriented in the upright vertical position, the tailgate 18 defines a rear wall of the pickup bed 16 and, when rotated downward to a horizontal position, the tailgate 18 exposes an opening in the rear end of the pickup bed 16. The tailgate 18 may pivot about a horizontal axis on or near a bottom end about a pair of hinges on opposite lateral sides to rotate the tailgate 18 between the open and closed positions and may include a latch to latch the tailgate 18 in the upright closed position.

The motor vehicle 10 further includes a lower wall 20 shown located at the rear end of the motor vehicle 10, generally below the pickup bed 16. The lower wall 20 is generally a vertical wall formed of sheet metal, such as steel or aluminum, for example, and includes a wiring hole 22 formed therein for routing one or more wires, such as wires provided in a cable through the wiring hole 22. The wiring hole 22 may be oblong or circular in shape with an edge that is rounded. The wiring hole 22 advantageously includes a grommet 24 that protects the wire or wires from contact with the edge of the wiring hole 22 in the metal lower wall 20 particularly when subjected to movement or vibration. It should be appreciated that the lower wall 20 may be made of metal and that the grommet 24 may be made of a polymeric material to protect the wire or wires from the edge of the wiring hole 22 formed in the metal wall.

Figure 1A:
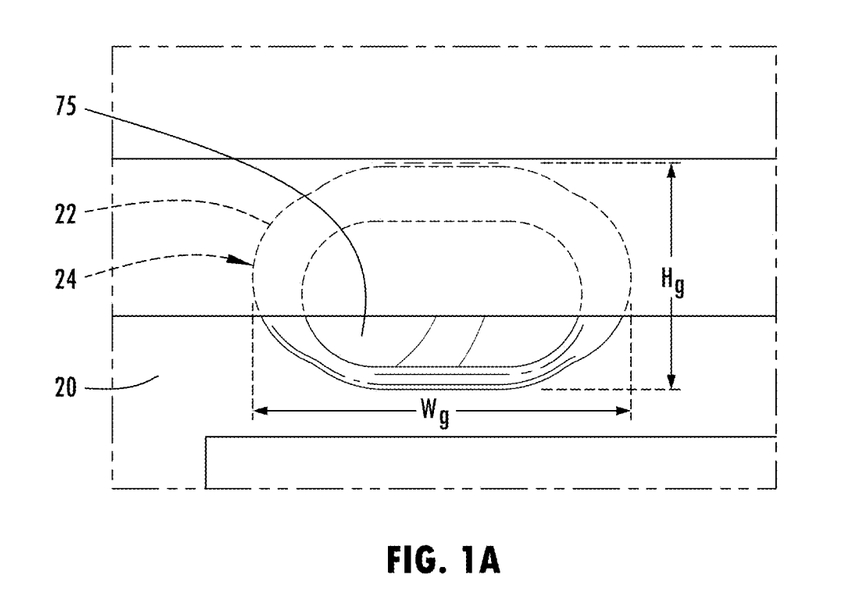
FIG. 1A is an enlarged view of section IA taken from FIG. 1 further illustrating the grommet in more detail.

The grommet 24 is illustrated in FIGS. 1A through 2-7C, according to one embodiment. The grommet 24 is a unitary molded single part, generally having an extendible ring-shaped body with a central opening. The grommet 24 may be made of a polymeric material such as plastic, for example. The grommet 24 may be molded, such as insert-molded from plastic into a bent configuration. This provides a first size ring and is flexible and deployable to be forced to snap into an extended use position that provides a larger second size ring when inserted within the wiring hole 22 in the lower wall 20 during assembly. As seen in the example in FIG. 2, the wiring hole 22 in the lower wall 20 has a generally oblong or oval shaped outer circumference with a width $W_h$ and a height $H_n$. The grommet 24 as seen in FIG. 1A has an overall width $W_g$ and height $H_g$. The grommet 24 in the bent position provides the first size ring with a width $W_g$ less than the width $W_h$ of the wiring hole 22. The grommet 24 has a height $H_g$ less than the height $H_n$ of the wiring hole 22. As such, the grommet 24 may be easily inserted within the wiring hole 22 during installation. When the grommet 24 is extended in the width direction and snap-fit into a planar assembled configuration that extends into the larger second size ring, the grommet 24 has a width $W_g$ that is about equal to the width $W_h$ of the wiring hole 22 and has a height $H_g$ less than the height $H_n$ of the hole 22. The grommet 24 is generally ring-shaped with a central opening 75 for receiving wires or cables that pass through.

Figure 2:
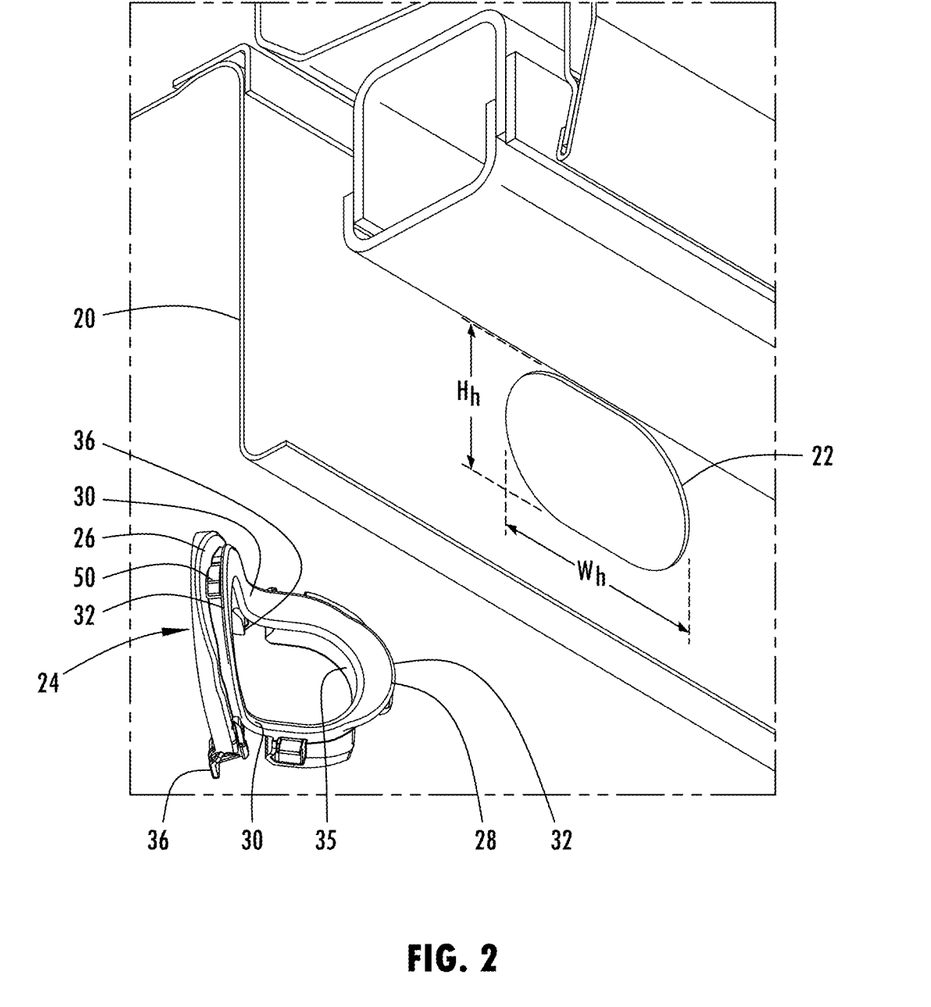
FIG. 2 is a first perspective view of the lower wall illustrating the wiring hole with the grommet prior to assembly.

Referring to FIG. 2, the grommet 24 is illustrated in the bent configuration having a bent body with a first portion 26 on one end and a second portion 28 on the opposite end, and a hinge 30 provided extending between the first portion 26 and second portion 28. The hinge 30 is a bent portion that is flexible and allows the first and second portions 26 to bend between the bent position shown and an extended generally planar position. The hinge 30 may be a plastic constant thickness structure hinge or a living hinge with a normally bent configuration and, upon applying force to flatten the grommet 24, the hinge 30 flexes to allow the change in shape to the planar shape. The first portion 26 and second portion 28 have a thicker reinforced backing structure.

Figure 3A:
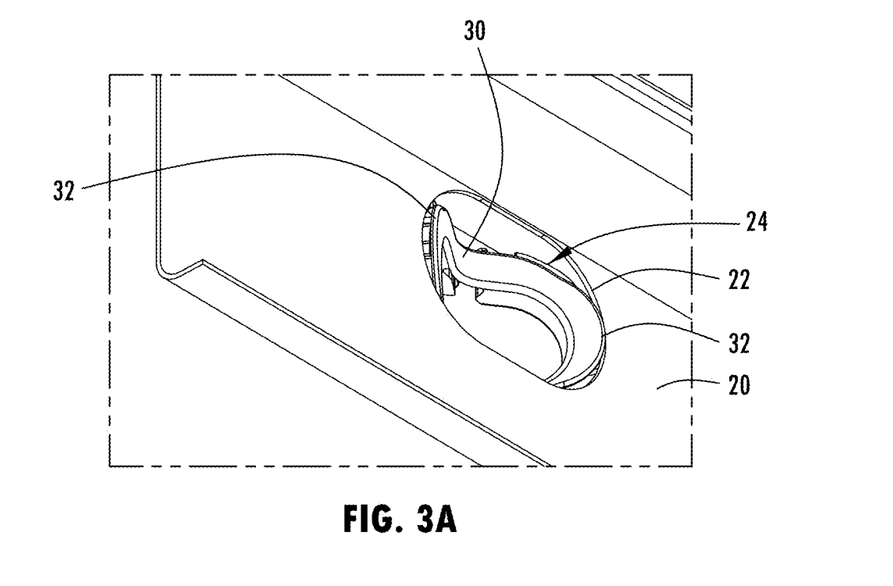
FIG. 3A is a first perspective view of the hole in the lower wall with the grommet inserted into the hole during assembly.
Figure 3B:
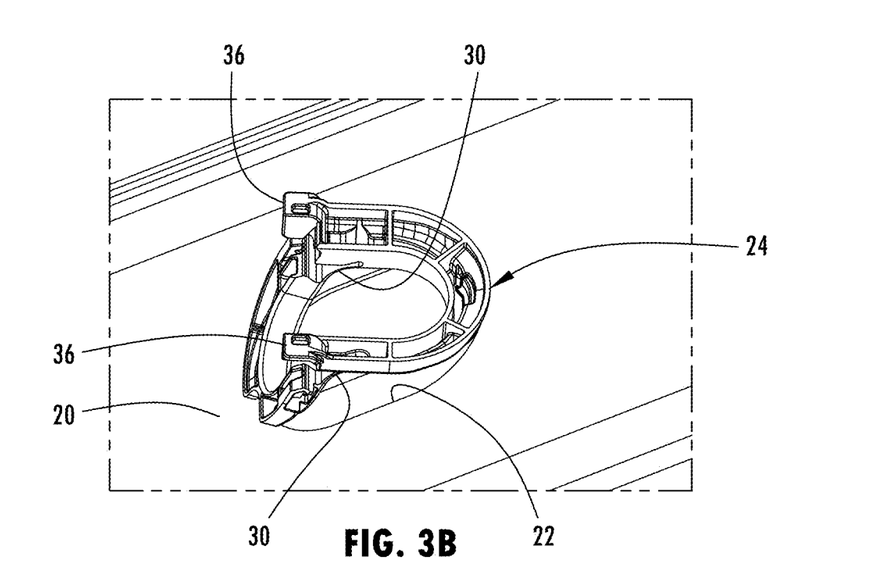
FIG. 3B is a new perspective view of the grommet inserted in the hole in the lower wall during assembly.
Figure 4A:
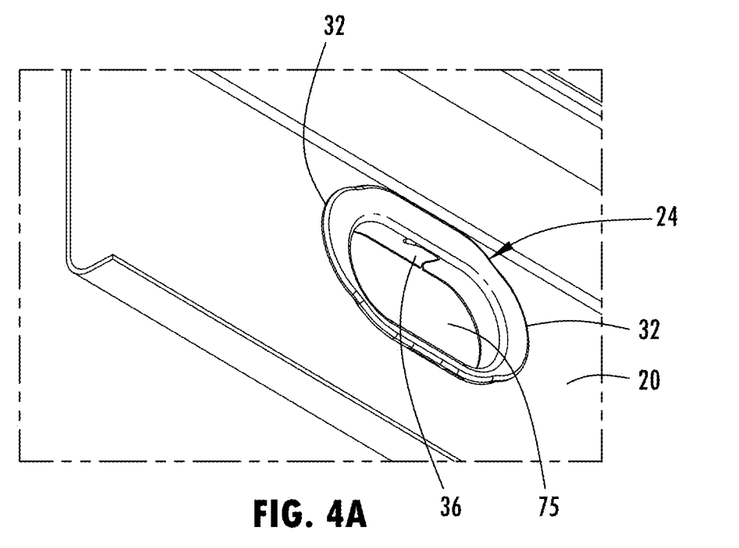
FIG. 4A is a front perspective view of the grommet fully assembled into the hole in the lower wall.
Figure 4B:
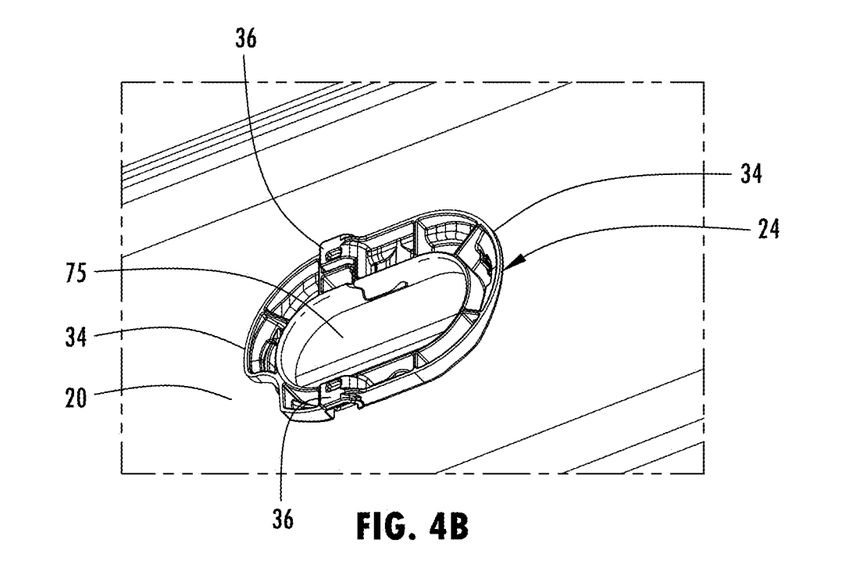
FIG. 4B is a rear perspective view of the grommet fully inserted in the hole.

As seen in FIGS. 3A and 3B, the grommet 24 may be inserted into the wiring hole 22 in the bent configuration such that the front side of the grommet 24 as seen in FIG. 3A extends on the front side against the circumference edge of the wiring hole 22 and the rear side of the grommet 24 as seen in FIG. 3B extends rearward of the wiring hole 22. To fully extend the grommet 24 to the extended use configuration, a user may apply force to depress the snap buttons 36 on the rear end to force the middle portion of the grommet ring 24 to extend forward into the extended planar configuration that extends the width of the wiring hole 22. The grommet 24 has an outer lip 32 as seen in FIG. 4A that extends radially from the wiring hole 22 and an inner lip 34 as seen in FIG. 4B which captures the wiring hole 22 on the inside of the grommet 24. The inner lip 34 and the outer lip 32 are separated by and form an engagement channel 35 therebetween, which may engage the inner and outer edges of the wiring hole 22 on opposite ends to snuggly engage the wiring hole 22 in the fully installed position.

Figure 5A:
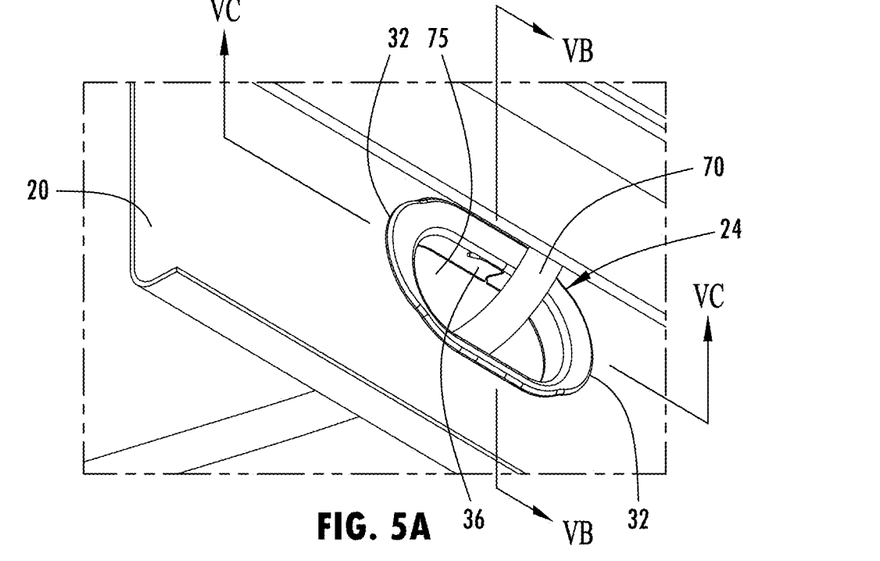
FIG. 5A is a front perspective view of the grommet fully assembled in the hole with a wire cable having wires extending therethrough.
Figure 5B:
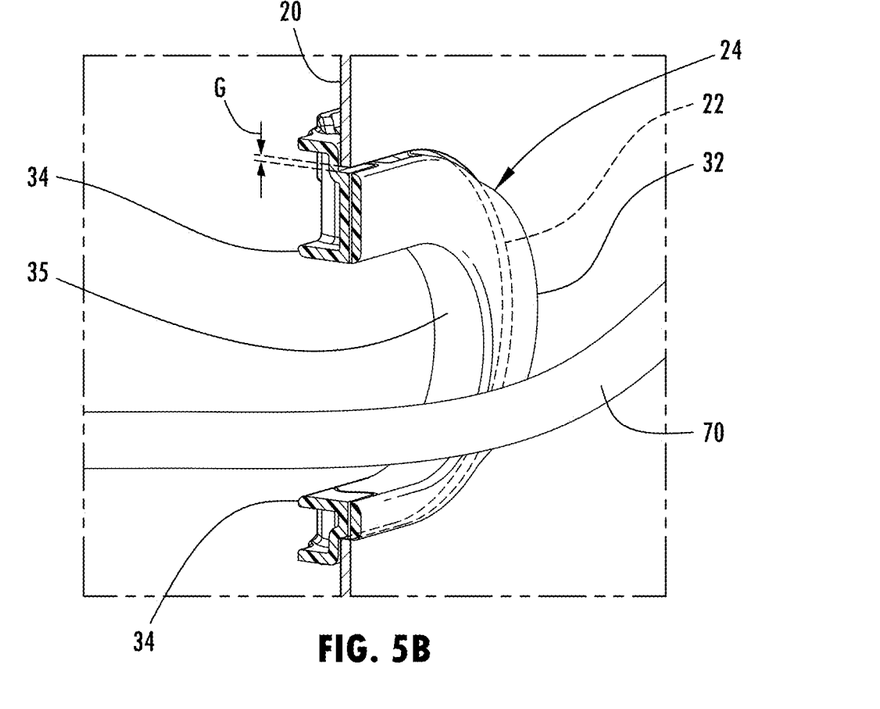
FIG. 5B is a cross-sectional view taken through line VB-VB of FIG. 5A further illustrating the grommet fully assembled in the hole.
Figure 5C:
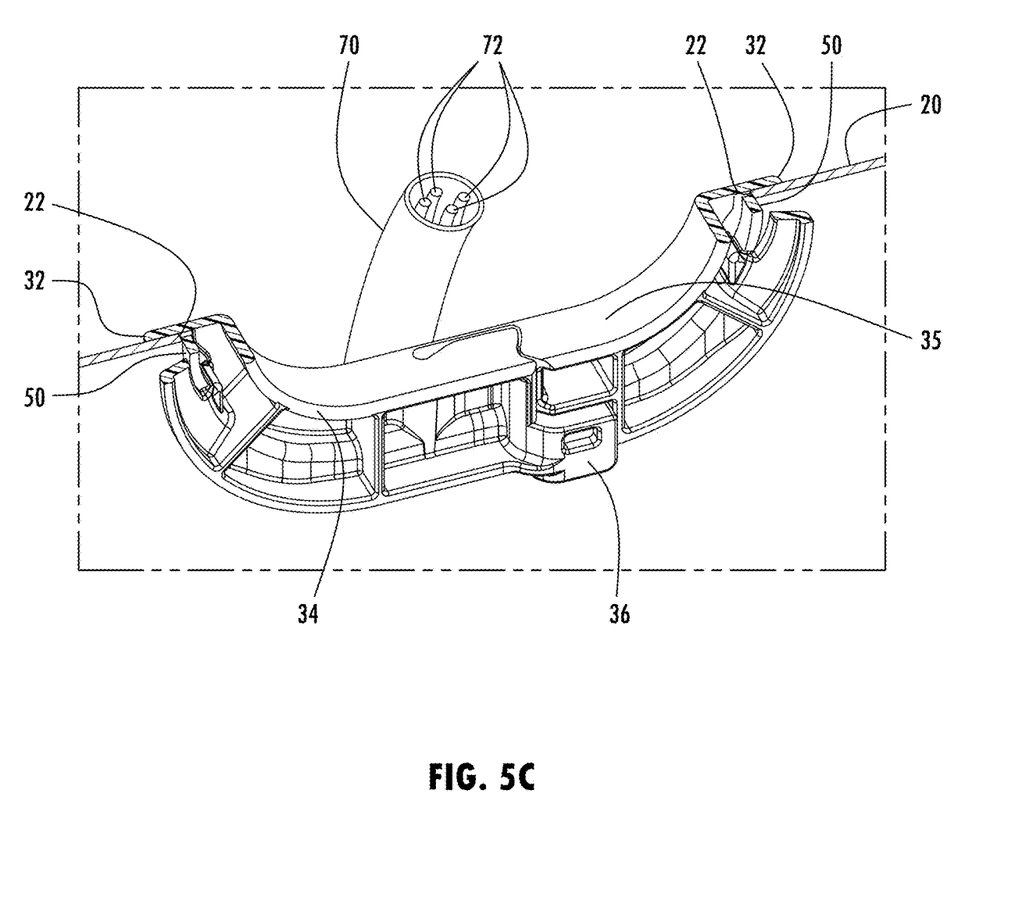
FIG. 5C is a cross-sectional view taken through line VC-VC of FIG. 5A further illustrating the grommet fully assembled in the hole.

The grommet 24 may be assembled into the wiring hole 22 by inserting the grommet 24 in the bent configuration from the rear side forward into and through the wiring hole 22 until the outer lip 32 engages and extends beyond at least a portion of the edge defining the wiring hole 22. A user may then forcibly press the two snap buttons 36 on the near end pushing forward to cause the hinge 30 to flatten and the first and second portions 26 and 28 to extend to the larger second ring size and fill the width of the wiring hole 22. The snap buttons 36 are depressed with force until the snap buttons 36 snap into a retained position that locks and holds the first and second portions 26 and 28 of the grommet 24 in a substantially planar extended configuration seen in FIGS. 4A and 4B. In this position, the outer lip 32 extends beyond the edge defining the ends of the wiring hole 22 and the inner lip 34 extends on the opposite side of the wall beyond the ends of the edge of the wiring hole 22. As such, the grommet 24 is extended into a position engaging and compressed against the opposite ends of the wiring hole 22 sufficient to prevent or reduce movement and rattling of the grommet 24. As seen in FIGS. 5A-5C, the ends along the width of the grommet 24 fill the wiring hole 22, whereas the height $H_n$ of the wiring hole 22 has a gap G between the wiring hole 22 and the grommet 24. The gap G allows the grommet 24 to extend into the wiring hole 22 prior to extending the grommet 24 from the first size ring to the second size ring during assembly.

In addition, a cable 70 is shown having wires 72 extending through the opening 75 in the grommet 24. The cable 70 may further extend into the tailgate and be routed across other areas of the vehicle, according to one example. The cable 70 may include one or more wires 72 as shown having a common protective sheath, according to one example. The cable 70 may be used to supply electrical power and/or communication signals.

In addition, the grommet 24 has a pair of anti-rattle tabs 50 formed on opposite ends across the width of the grommet 24 The anti-rattle tabs 50 may include plastic springs that provide a spring bias to ensure a bias force engagement of the grommet 24 within the opposite ends of the wiring hole 22. As such, the anti-rattle tabs 50 may flex while still maintaining a snug connection of the grommet 24 within the wiring hole 22.

Figure 6A:
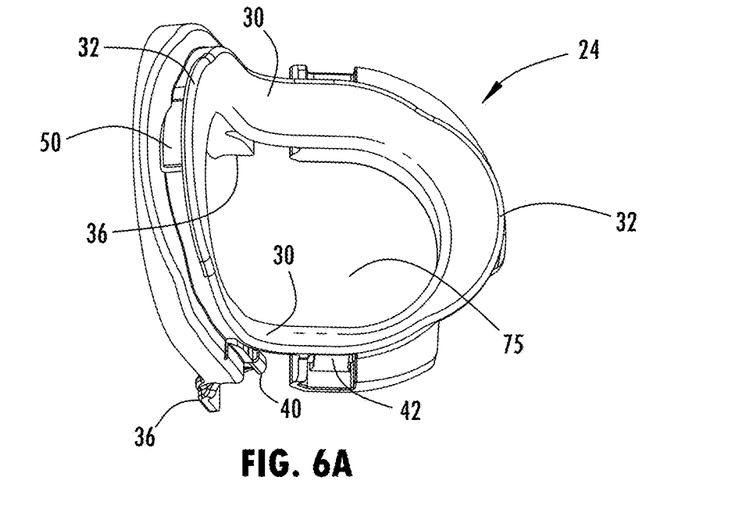
FIG. 6A is a front perspective view of the grommet in a bent configuration providing a first size ring prior to assembly.
Figure 6B:
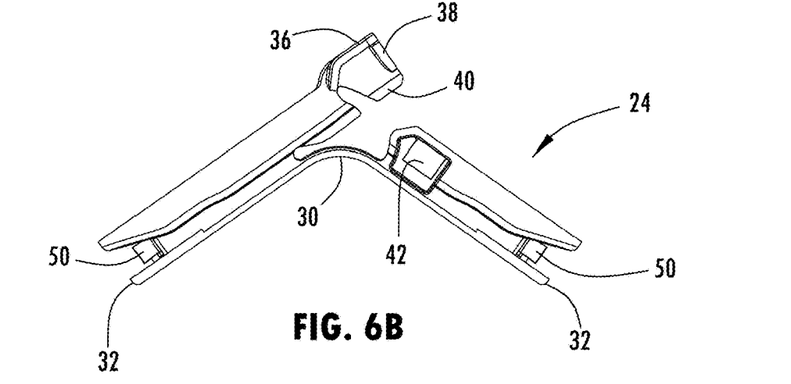
FIG. 6B is a side view of the grommet shown in FIG. 6A in the bent configuration.
Figure 6C:
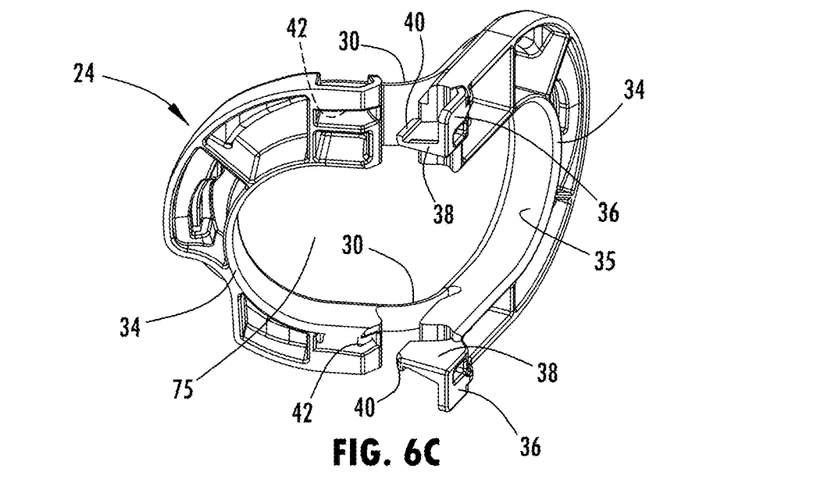
FIG. 6C is a rear perspective view of the grommet shown in FIG. 6A in the bent folded configuration.

With particular reference to FIGS. 6A-6C, the snap buttons 36 are shown each having a leg 38 leading to a tooth 40. The tooth 40 is aligned with a retainer edge 42 such that when the snap buttons 36 are depressed to reform the shape and extend the grommet ring 24 from the bent configuration to a planar extended configuration, the tooth 40 engages the retainer edge 42 to lock the first portion 26 into engagement with the second portion 28 in the planar extended configuration. It should be appreciated that once locked into place in the extended position, the grommet 24 remains in a substantially planar extended size ring configuration assembled within the wiring hole 22. It should further be appreciated that the grommet 24 may be disassembled from the wiring hole 22 by forcing the tooth 40 out of engagement with the retainer edge 42 to allow the grommet ring 24 to return to the bent configuration in which it can be removed from the wiring hole 22.

Figure 7A:
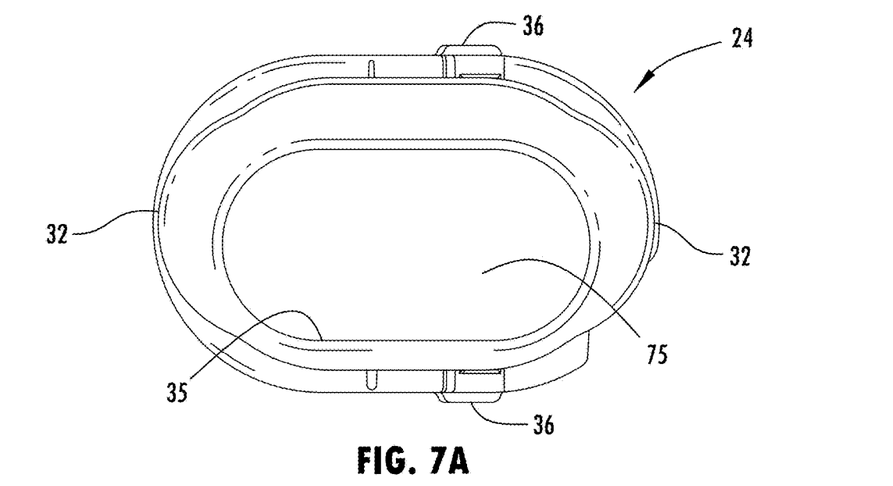
FIG. 7A is a front perspective view of the grommet in a snap-fit extended configuration providing a large second size ring.
Figure 7B:
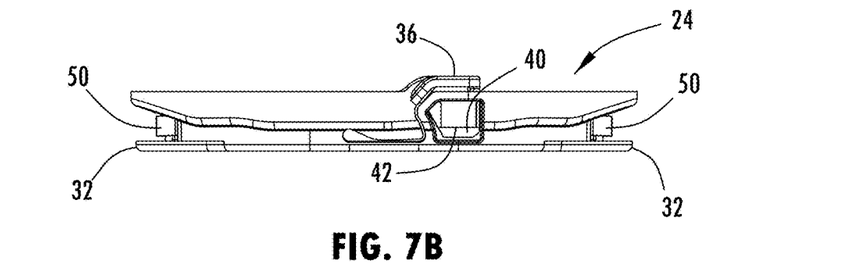
FIG. 7B is a side view of the grommet shown in FIG. 7A in the extended configuration.
Figure 7C:
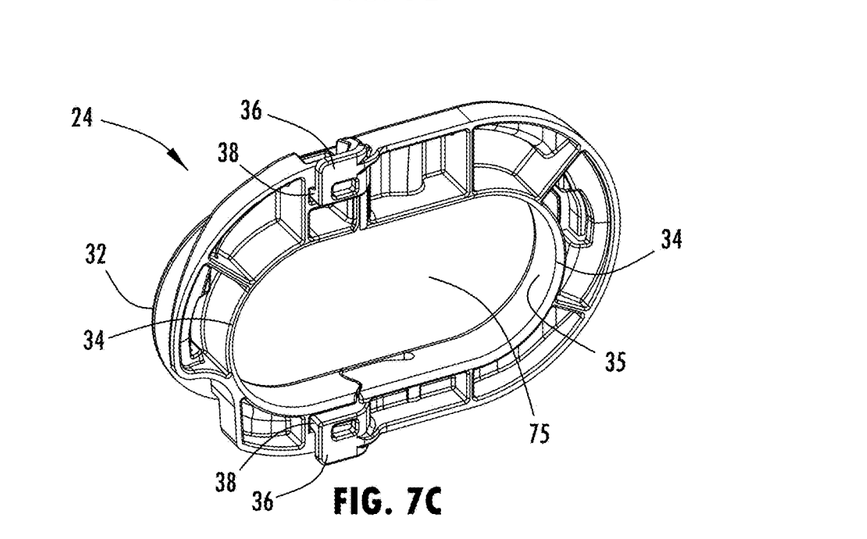
FIG. 7C is a rear view of the grommet shown in FIG. 7A in the extended configuration.

Referring to FIG. 7A-7C, the grommet 24 is further illustrated in the assembled substantially planar extended configuration. In this configuration, the grommet 24 may be locked in place within the wiring hole 22. One or more wires or cables may be routed through the central opening 75 in the grommet 24. The grommet 24 in the fully assembled position presents a cosmetically smooth surface on the vehicle exterior.

The grommet 24 advantageously is easily installable in a wiring hole 22 on a motor vehicle 10 to protect the wires, such as cables, routed through the hole. It should be appreciated that the motor vehicle 10 may be equipped with one or more grommets 24 in wiring holes 22 at various locations on the motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A grommet for a wiring hole, the grommet comprising:
   an extendable body that is configured in a first size ring and extendable into a second size ring that is larger than the first sized ring;
   a lip extending around the extendable body and configured to engage the wiring hole for routing one or more wires; and
   one or more snap locks for locking the extendable body in the second size ring disposed within the wiring hole.

2. The grommet of claim 1, wherein the extendable body comprises an injection-molded part.

3. The grommet of claim 2, wherein the extendable body comprises a polymeric material.

4. The grommet of claim 1, wherein the one or more snap locks comprises a plurality of snap locks.

5. The grommet of claim 4, wherein a plurality of snap locks comprises a first snap lock and a second snap lock.

6. The grommet of claim 5, wherein each of the first and second snap locks each comprises a tooth that engages an edge in a locked position.

7. The grommet of claim 1, wherein the lip comprises an inner lip and an outer lip configured to engage an inside and an outside surface proximate the wiring hole.

8. The grommet of claim 1 further comprising one or more anti-rattle tabs.

9. The grommet of claim 1, wherein the extendable body has a dimension less than a dimension of the wiring hole.

10. The grommet of claim 1, wherein the extendable body comprises a first portion, a second portion, and a hinge coupling the first portion to the second portion.

11. The grommet of claim 10, wherein the hinge flexes to allow the extendable body to move between the first and second sized rings.

12. A vehicle comprising:
    a wire;
    a wiring hole and;
    a grommet comprising:
      an extendable body that is configured in a first size ring and extendable into a second size ring that is larger than the first size ring;
      a lip extending around the extendable body and engaging the wiring hole;
      one or more snap locks for locking the extendable body in the extended second size ring disposed within the wiring hole; and
      a central opening, wherein the wire extends through the central opening.

13. The vehicle of claim 12, wherein the wiring hole is in a metal sheet and the grommet is polymeric.

14. The vehicle of claim 12, wherein the extendable body comprises a first portion, a second portion, and a hinge coupling the first portion to the second portion, and further wherein the hinge flexes to allow the extendable body to move between the first and second sized rings.

15. The vehicle of claim 12, wherein a plurality of snap locks comprises a first snap lock and a second snap lock.

16. A method of installing a grommet in a wiring hole on a vehicle, the method comprising the steps of:
    providing the grommet having an extendable body that is configured in a first sized ring and extendable into a second sized ring larger than the first sized ring, and a lip extending around the extendable body and configured to engage the wiring hole for routing one or more wires, and further including one or more snap locks for locking the extendable body in the second size ring;
    inserting the grommet with the first size ring in the wiring hole in the vehicle; and
    extending the size of the grommet ring inside the wiring hole to the second size ring;
    locking the grommet in the second size ring with one or more snap locks.

17. The method of claim 16, further comprising pressing one or more buttons to extend the extendable body from the first size ring to the extended second size ring.

18. The method of claim 16, further comprising the step of routing a wire or cable through a central opening in the grommet.

19. The method of claim 16, further comprising the step of molding the grommet as a unitary piece.

20. The method of claim 19, wherein the grommet is formed of a polymetric material.

* * * * *